UNITED STATES PATENT OFFICE.

JOSEPH ERWIN LORD, OF NORWICH, VERMONT.

COMPOSITION OF MATTER FOR HERMETICALLY SEALING JARS FOR THE PRESERVATION OF FOOD-STUFFS.

No. 828,039.     Specification of Letters Patent.     Patented Aug. 7, 1906.

Application filed October 25, 1905. Serial No. 284,312.

*To all whom it may concern:*

Be it known that I, JOSEPH ERWIN LORD, a citizen of the United States, residing at Norwich, in the county of Windsor and State of Vermont, have invented a certain new and useful Composition of Matter for Hermetically Sealing Jars for the Preservation of Food-Stuffs, of which the following is a specification.

This composition consists of the following ingredients combined in the proportions stated—to wit, common rosin, two parts, by weight; beef-tallow, one part, by weight; fine sawdust, one part, by weight. These ingredients are compounded by first reducing the beef-tallow to a liquid state by heating same, adding the rosin in small quantities until the entire mass is in a liquid state, and then adding the sawdust and thoroughly mixing. This mixture is then heated for a few minutes.

The rosin employed is preferably ordinary pine-tree rosin. Care should be exercised to avoid the presence in the tallow of scraps or small pieces of meat, which would tend to decomposition or animal taint. The sawdust is preferably of a soft wood kiln-dried to remove vegetable juices and prepare it for the absorption of the tallow and rosin and should be free from large grains, dirt, and splinters. The sawdust gives bulk to the composition without proportionately increasing its weight, while at the same time, with the tallow, tempering the rosin, so as to prevent the crystallization thereof, while permitting the composition as a whole to set in a manner to make it firm and tough. These ingredients when combined produce a composition which may be readily reduced to a plastic state, while quickly setting when cooled. The sawdust gives body and mass to the composition, absorbing in part the tallow. The rosin forms a film about both the tallow and the impregnated sawdust, protecting them from atmospheric conditions and destructive agents. Through its adhesive qualities it causes the entire composition to set in a solid mass and when heated by adhering firmly to the members of the jar and its closure to hold these parts firmly in place when it sets, and through the solidifying of the entire mass and adhesion to the jar and its closure it serves to effectively hermetically seal the jar.

The composition while thus effectively sealing a jar is also susceptible of being so softened by the application of heat at a comparatively low temperature to the neck of the jar as to permit the convenient removal of the closure without affecting the contents of the jar through the application of excessive heat or requiring the exercise of excessive force.

The composition is used by being heated at a temperature which will reduce it to a plastic state and then being packed within the neck of the jar upon and about a closure-cover properly sterilized and placed in the neck of a jar and sealed, so as to exclude this composition from contacting with the contents of the jar in any manner whatsoever. When it sets, the properties of the ingredients prevent the composition from becoming hard and cracking, said composition when cold being fairly soft, though firm and tough.

This composition is not susceptible to deterioration from climatic changes and will stand indefinitely without deterioration or loss of efficiency in sealing the jar and protecting its contents.

The exact proportions of the ingredients may be varied slightly without materially affecting the qualities of the composition; but I have found that substantially the proportions stated attain the best results and should be adhered to.

Having described the invention, what I claim as new, and desire to have protected by Letters Patent, is—

A composition of matter for hermetically sealing jars for the preservation of food-stuffs consisting of one part beef-tallow, two parts rosin, and one part fine sawdust, all by weight, melted and mixed together as described.

In witness whereof I have hereunto affixed my signature, this 21st day of October, 1905, in the presence of two witnesses.

JOSEPH ERWIN LORD.

Witnesses:
 E. W. OLDS,
 A. L. DOUGLASS.